US011638392B2

(12) United States Patent
Hertzog et al.

(10) Patent No.: US 11,638,392 B2
(45) Date of Patent: May 2, 2023

(54) AGRICULTURAL IMPLEMENT

(71) Applicant: CNH Industrial America LLC, New Holland, PA (US)

(72) Inventors: Daniel Hertzog, Blackstad (SE); Bengt Per-Inge Linderson, Odensvi (SE); Per Dennis Wallin, Västervik (SE); Carl Ola Fredrik Nilsson, Västervik (SE); Robert Svensson, Loftahammar (SE); Rickard Karl Gustav Nåhdin, Gamleby (SE)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 220 days.

(21) Appl. No.: 16/849,093

(22) Filed: Apr. 15, 2020

(65) Prior Publication Data
US 2020/0337202 A1    Oct. 29, 2020

(30) Foreign Application Priority Data

Apr. 25, 2019    (EP) .................................... 19171233

(51) Int. Cl.
*A01B 61/04*    (2006.01)
*A01B 63/32*    (2006.01)
(Continued)

(52) U.S. Cl.
CPC .............. *A01B 61/044* (2013.01); *A01B 3/24* (2013.01); *A01B 63/004* (2013.01);
(Continued)

(58) Field of Classification Search
CPC ....... A01B 61/044; A01B 3/26; A01B 63/008; A01B 63/32; A01B 79/005; A01B 3/28–34
See application file for complete search history.

(56) References Cited

U.S. PATENT DOCUMENTS

| 6,041,582 A | 3/2000 | Tiede et al. |
| 6,061,617 A * | 5/2000 | Berger et al. .......... A01B 63/10 700/18 |

(Continued)

FOREIGN PATENT DOCUMENTS

| DE | 4232067 | 4/1993 |
| DE | 102015111518 | 1/2017 |

(Continued)

OTHER PUBLICATIONS

Extended European Search Report for EP Application No. 19172330 dated Nov. 6, 2019 (seven pages).
(Continued)

*Primary Examiner* — Tara Mayo
(74) *Attorney, Agent, or Firm* — Rebecca Henkel; Rickard Demille

(57) ABSTRACT

An agricultural implement comprising: a ground engaging tool; and an actuator mechanism (366; 466; 566). The actuator mechanism is configured to provide a bias force to the ground engaging tool such that it is biased towards a working position. The agricultural implement also includes a controller that is configured to automatically set the level of the bias force that is provided by the actuator mechanism based on control-data.

18 Claims, 7 Drawing Sheets

(51) Int. Cl.
    *A01B 79/00*     (2006.01)
    *A01B 3/24*     (2006.01)
    *A01B 63/00*     (2006.01)
    *A01B 63/24*     (2006.01)
    *A01B 69/04*     (2006.01)
    *A01B 3/28*     (2006.01)
    *A01B 15/02*     (2006.01)

(52) U.S. Cl.
    CPC .......... *A01B 63/008* (2013.01); *A01B 63/245* (2013.01); *A01B 63/32* (2013.01); *A01B 69/008* (2013.01); *A01B 79/005* (2013.01); *A01B 3/28* (2013.01); *A01B 15/02* (2013.01)

(56) References Cited

U.S. PATENT DOCUMENTS

| | | | |
|---|---|---|---|
| 6,070,673 | A | 6/2000 | Wendte |
| 9,717,178 | B1 * | 8/2017 | Sauder et al. ....... A01B 79/005 |
| 2012/0237083 | A1 | 9/2012 | Lange et al. |
| 2015/0264857 | A1 * | 9/2015 | Achen et al. .......... A01B 49/06 111/149 |
| 2016/0100517 | A1 | 4/2016 | Bassett et al. |
| 2018/0310465 | A1 | 11/2018 | Peterson |
| 2019/0174667 | A1 | 6/2019 | Gresch et al. |
| 2020/0337208 | A1 | 10/2020 | Hertzog et al. |

FOREIGN PATENT DOCUMENTS

| | | | | |
|---|---|---|---|---|
| WO | WO-2017011053 | A1 * | 1/2017 | ............ A01G 25/167 |
| WO | WO-2017049186 | A1 * | 3/2017 | ............ G01S 13/885 |
| WO | WO-2020113284 | A1 * | 6/2020 | ............ A01C 21/007 |

OTHER PUBLICATIONS

EP Application No. 19204069.9 Extended Search Report dated May 29, 2020, 10 pgs.

\* cited by examiner

Force 367

Force 467

AGRICULTURAL IMPLEMENT

BACKGROUND OF THE INVENTION

The present disclosure relates to an agricultural implement, particularly, but not exclusively, to an agricultural plough and a method of operating an agricultural implement.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are laterally offset manner from each other when the plough is in use. Each plough body is connected to the plough frame via corresponding beams. The plough frame, in turn, is connected to a towing or pushing vehicle via a hitch arranged at a front or back end of the frame.

Depending on the density of the soil, a working depth of the plough bodies can be adjusted. For instance, the plough bodies working depth may be shallow in harder (dense) soils, whereas a deeper working depth may be applied in softer (less dense) soils. The plough bodies can be rigidly attached to the main frame, such that their distance from the main frame remains constant. Accordingly, the working depth of the ploughs are then adjusted by varying the ground clearance of the main frame. If the main frame is brought closer to the ground surface, the ground clearance is reduced, and the plough bodies penetrate deeper into the soil. Similarly, if the main frame is lifted further off the ground, the ground clearance is increased and the plough bodies are lifted, thereby reducing the working depth.

The ground clearance of the main frame may be controlled by one or more depth wheels. The one or more depth wheels may be connected to any part of the main frame such as the rear end of the main frame. An adjustable linkage may be provided between the main frame and the depth wheel to allow for changes in the distance between the depth wheel and the main frame. During ploughing, the depth wheel runs on the ground surface and supports the weight of the plough. If the distance between the depth wheel and the main frame is reduced, then the ground clearance between the main frame and the ground surface reduces accordingly. On the other hand, if the distance between the depth wheel and the main frame is increased, the ground clearance of the main frame increases. As outlined before, changing the main frame's ground clearance results in a variation of the plough body working depth.

Most modern ploughs are of the reversible type, in which the main frame is rotatable by 180 degrees (i.e. reversed) with respect to the headstock. A turning cylinder attached to the headstock may be used to rotate (reverse) the plough. During rotation of the main frame, a first set of plough bodies, which was initially arranged below the main frame (first configuration), is transferred to the top of the main frame. At the same time, a second set of plough bodies, which was initially arranged on top of the main frame, is then transferred to a position below the main frame. The reversible plough is then in its second configuration. The main frame may be repeatedly rotated (reversed) between the first and second configuration, particularly during turning manoeuvres on the headlands. Whenever the plough is reversed, the first and second set of plough bodies swap position.

In reversible ploughs, a means of adjusting the working depth of the plough bodies (i.e. the main frame) is required for both configurations of the reversible plough. There are mainly two types of depth control wheels for reversible ploughs. A first type includes a single pivoting depth wheel, which is used in both configurations of the reversible plough. The single pivoting depth wheel has to be moved from one side of the main frame to the other during reversal. This side transfer of the single depth wheel may be achieved by swinging the latter from one side to the other.

A second solution avoids the need for a movement of the depth adjustment wheel from one side to the other. In this second alternative, two separate depth wheels may be fixed to the main frame. A first depth wheel can be arranged on a first side of the main frame and a second depth wheel may be arranged on the second, opposite side of the main frame. Each of the two wheels is then only utilised in one configuration of the plough.

U.S. Pat. No. 6,070,673 (A) describes a global positioning system (GPS) based soil tillage system.

US2018310465 (A1) describes a system for monitoring soil conditions within a field may include an implement configured to be traversed across a field.

US2016100517 (A1) describes an agricultural implement including at least one row unit having a plurality of support members, each of which is pivotably coupled to an attachment frame or another of the support members to permit vertical pivoting vertical movement of the support members, and a plurality of soil-engaging tools, each of which is coupled to at least one of the support members.

SUMMARY OF THE INVENTION

Aspects and embodiments of the disclosure provide an agricultural implement as claimed in the appended claims.

According to one aspect of the current disclosure, there is provided an agricultural implement comprising:

a ground engaging tool;

an actuator mechanism that is configured to provide a bias force to the ground engaging tool such that it is biased towards a working position; and a controller that is configured to automatically set the level of the bias force that is provided by the actuator mechanism based on control-data.

Advantageously, such an actuator mechanism can be set such that the performance of the agricultural implement is improved. For instance, in examples where the actuator mechanism is a stone trip mechanism for a plough, the stone trip mechanism can be controlled such that it trips at an appropriate reactive force that is experienced by a plough body. In this way: (i) the likelihood of a false trip occurring, when no stone is present, can be reduced; (ii) the likelihood of the ground engaging tool regularly being in a semi-tripped state when it should be in a working position can be reduced; and/or (iii) the likelihood that the ground engaging tool does not trip when a stone is encountered can be reduced.

The actuator mechanism is a stone trip mechanism. The agricultural implement is a plough.

The control data may comprise previous-trip-event-data, which is representative of one or a plurality of earlier instances when the ground engaging tool has left its working position. The previous-trip-event-data may represent trip events (instances when the ground engaging tool has left its working position) in an earlier trip-window of time.

The previous-trip-event-data may comprise one or more of:

trip-frequency-data that is representative of the frequency with which the ground engaging tool leaves its working position;

individual-trip-duration-data that is representative of the duration for which the ground engaging tool has left its working position for an individual trip event;

cumulative-trip-duration-data that is representative of the duration for which the ground engaging tool has left its working position over a predetermined period of time; and trip-speed-data that is representative of the speed with which the ground engaging tool leaves its working position.

The previous-trip-event-data may comprise:

same-tool-trip-data that is representative of trip events for the ground engaging tool that is associated with the actuator mechanism that is to be controlled; and/or neighbouring-tool-trip-data that is representative of trip events for a ground engaging tool that is not associated with the actuator mechanism that is to be controlled.

The control-data may comprise operational-data, which is representative of one or more operational parameters of the agricultural implement or an associated agricultural vehicle. The operational-data may comprise one or both of:

speed-data, which is representative of the speed of the agricultural implement and/or the associated agricultural vehicle; and wheel-slip-data, which is representative of the degree of wheel slip experienced by a wheel of the agricultural implement and/or the associated agricultural vehicle.

The control-data may comprise soil-data, which is representative of one or more characteristics of the soil that is to be worked by the agricultural implement. The soil-data may comprise one or more of:

soil-moisture-data, which is representative of the moisture level of the soil;

soil-compaction-data, which is representative of the density of the soil; and soil-temperature-data, which is representative of the temperature of the soil.

The control-data may comprise low-force-location-data, which is representative of known locations in a field that is to be worked by the agricultural implement in which a low bias force is desirable. The controller may be configured to automatically set the level of the bias force that is provided by the actuator mechanism based on (i) the low-force-location-data and (ii) implement-location-data that is representative of a current location of the agricultural implement.

The controller may be configured to set the level of the bias force that is provided by the actuator mechanism such that it does not exceed a maximum-force-value and/or it does not drop below a minimum-force-value.

The actuator mechanism may comprise a cylinder and optionally an accumulator. The accumulator may be configured to maintain a pressure of fluid in the cylinder. The controller may be configured to set a level of fluid pressure in the cylinder based on the control-data.

The controller may be configured to store a location of the ground engaging tool at a time that the ground engaging tool leaves its working position as trip-location-data.

There may be provided a computer-implemented method of operating an agricultural implement, the agricultural implement comprising:

a ground engaging tool;

an actuator mechanism that is configured to provide a bias force to the ground engaging tool such that it is biased towards a working position;

wherein the method comprises:

automatically setting the level of the bias force that is provided by the actuator mechanism based on control-data.

The control-data may comprise previous-trip-event-data. The method may further comprise:

directly or indirectly monitoring the position of the ground engaging tool and/or the speed with which the ground engaging tool leaves it's working position; and determining the previous-trip-event-data based on the monitored position or speed of the ground engaging tool.

The agricultural implement may include a frame, and a beam that connects the ground engaging tool to the frame. The beam may be movable connected to the frame. For instance, it may be pivotally connected to the frame. The actuator mechanism may be configured to provide a bias force to the beam such that the ground engaging tool is biased towards a working position.

The at least one ground engaging tool may be a plough body.

The agricultural implement may be a reversible plough.

There may be provided an agricultural machinery comprising an agricultural vehicle and any agricultural implement disclosed herein. The agricultural implement may be connected to the front or the rear of the agricultural vehicle.

There may be provided a computer program, which when run on a computer, causes the computer to configure any apparatus, including a controller, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which:

FIG. 10 shows a plan view of the agricultural implement shown in FIG. 1A;

DETAILED DESCRIPTION OF THE DRAWINGS

Figure 1A:
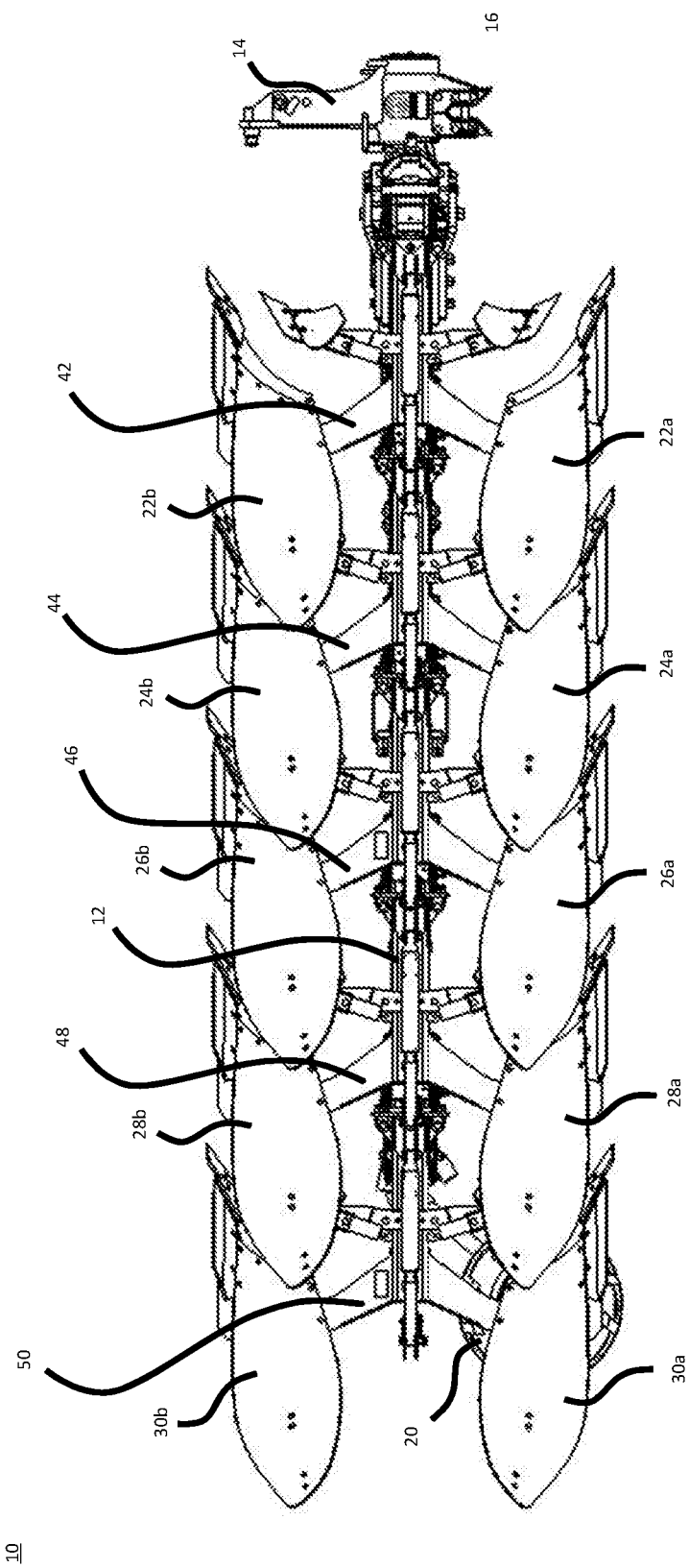
FIG. 1A shows a right-side view of an agricultural implement with fixed ground engaging tools.
Figure 1B:
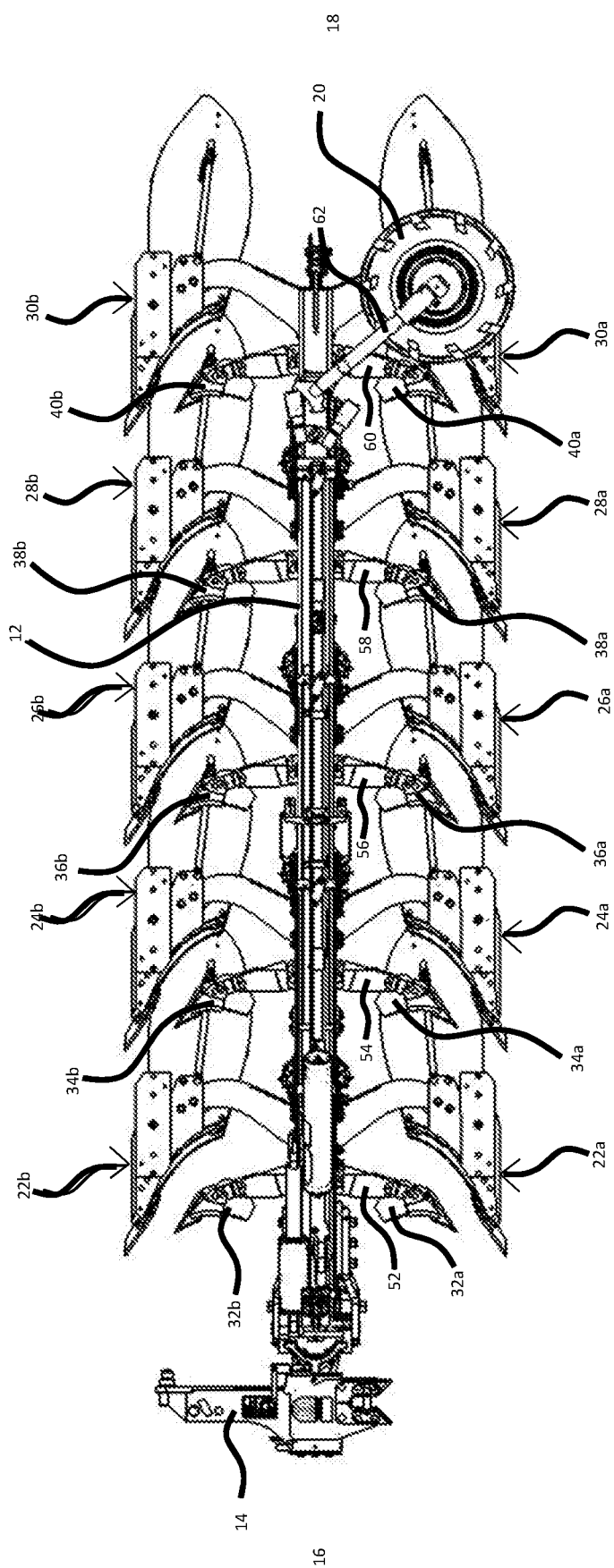
FIG. 1B shows a left-side view of the agricultural implement shown in FIG. 1A.
Figure 1C:
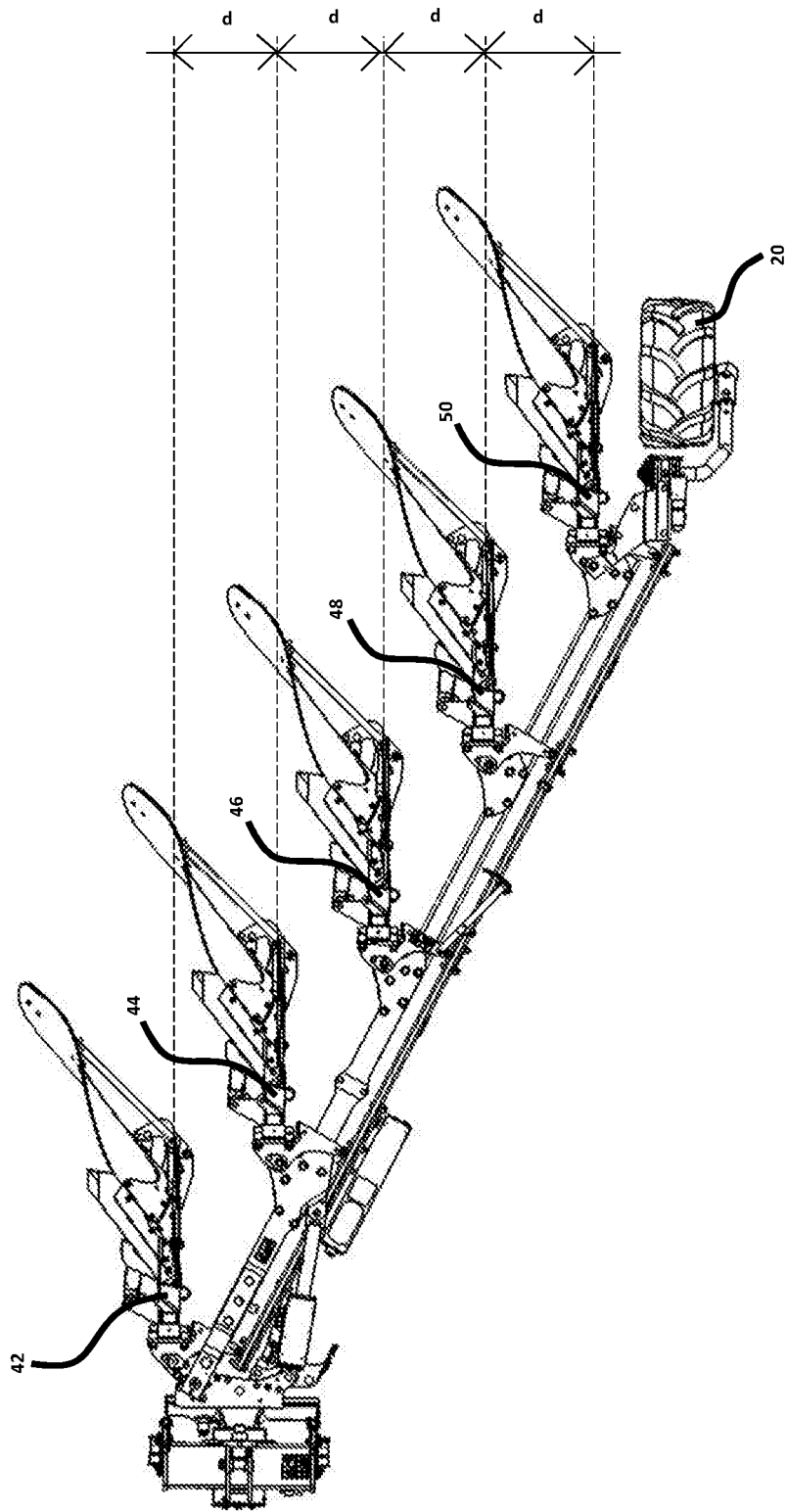

FIGS. 1A to 10 show various views of an agricultural implement, particularly a plough 10. As will be described in more detail below, the plough 10 shown in FIGS. 1A to 10 is a reversible plough.

The plough 10 comprises a main frame 12. The main frame 12 may be a rectangular or round tube extending between a headstock 14 at a front end 16 of the plough towards a depth wheel 20 at a rear end 18 of the plough. The main frame 12 supports a variety of ground-engaging tools.

In the example of FIGS. 1A to 10, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. A plurality of first ground engaging tools, i.e. plough bodies 22a, 24a, 26a, 28a, 30a and skimmers 32a, 34a, 36a, 38a, and 40a, are arranged on a first side of the main frame 12. In a first configuration of the main frame 12, illustrated in FIGS. 1A to 10, the plurality of first ground engaging tools are arranged below the main frame 12.

A plurality of second ground engaging tools, i.e. plough bodies 22b, 24b, 26b, 28b, 30b and skimmers 32b, 34b, 36b, 38b, and 40b, are arranged on a second side of the main frame 12, opposite to the plurality of first ground engaging tools. In the first configuration of the main frame 12, illustrated in FIGS. 1A to 10, the plurality of second ground engaging tools are arranged above the main frame.

Each of the plough bodies 22a, 22b, 24a, 24b, 26a, 26b, 28a, 28b, 30a, 30b is connected to the main frame 12 by means of beams 42, 44, 46, 48, 50. Each of the beams 42, 44, 46, 48, 50 has a substantially Y-shaped structure.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b.

Each of the pairs of plough bodies 22a, 22b, 24a, 24b, 26a, 26b, 28a, 28b, 30a, 30b is designed to create a furrow in the field when the plough is dragged behind or pushed by an agricultural vehicle such as a tractor. It follows that each run of the illustrated plough 10 through a field creates five adjacent furrows.

Figure 2:
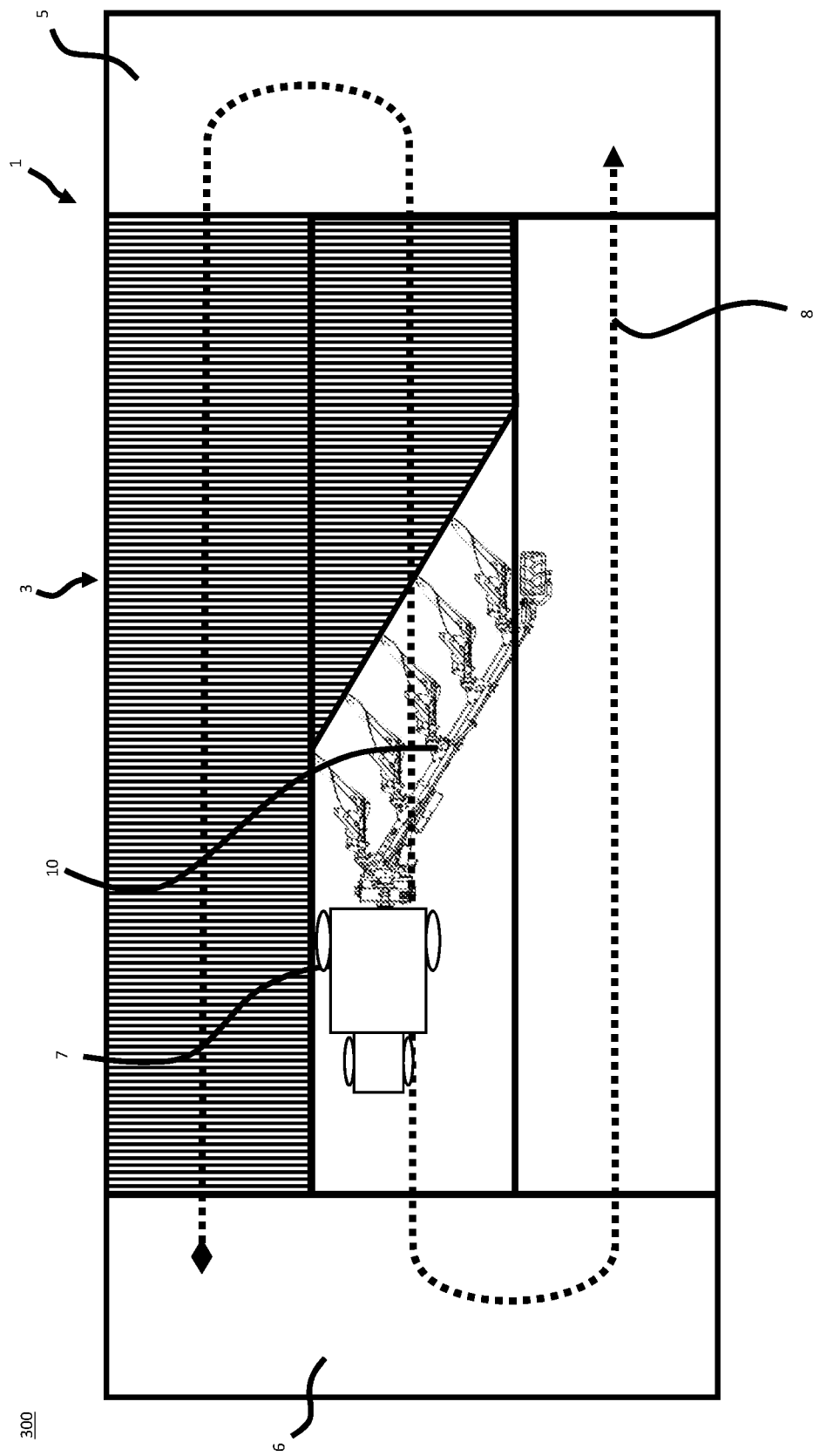
FIG. 2 shows a schematic representation of the trajectory of an agricultural machinery within a work area.

Turning to FIG. 2, a typical operation of an agricultural machinery comprising a tractor 7 and a plough 10 is described. In use, the plough 10 is drawn as an attachment (implement) behind an agricultural towing vehicle (e.g. tractor 7). It will be appreciated that it is equivalently feasible to locate the plough 10 in front of or both in front of and behind the tractor 7.

FIG. 2 shows a schematic work area 1, e.g. a crop field, which is divided into a main field 3 and headlands 5,6. A tractor 7 draws the plough 10 across the main field 3 in generally parallel working rows. The working rows are part of the trajectory 8 of the tractor 7 and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 10 creates a total of five furrows per run.

At the end of each run/working row, the tractor 7 and plough 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5, 6 more than necessary, it is known to lift the ground engaging tools, such as the plough bodies and the skimmers, off the ground into a headland or transfer position, just before the plough 10 reaches the headlands 5 or 6 respectively. Once the tractor 7 and the corresponding plough 10 have turned on the headland 5, 6, the ground engaging tools of the plough 10 are, again, lowered towards an operating position to engage the soil of the main field 3.

In the illustration of FIG. 2, the plough 10 is working on the main field 3 and, therefore, is arranged in the operating position. As the plough 10 reaches the border between the headland 5/6 and the main field 3, the plough 10 is transferred to a headland/transfer position. It follows that each working row starts with an adjustment of the plough from the transfer position into the operating position and ends with an adjustment of the plough from the operating position into the transfer position.

The plough 10 shown in FIGS. 1A to 10 is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

During the turning movement on the headlands, the plough 10 is also reversed. That is, the main frame 12 is rotated by 180 degrees with respect to the headstock 14 to move the plough from a first configuration to a second configuration. In its first configuration shown in FIGS. 1A to 10, the plough 10 is set up such that plough bodies 22a, 24a, 26a, 28a, and 30a of each of the pairs are in contact with the soil. This first configuration is shown in FIG. 2 and sometimes referred to as the "right turning configuration", since the mouldboards of the plough bodies 22a, 24a, 26a, 28a and 30a are arranged to move the soil sideways from left to right when viewed in the direction of travel. In its second configuration (not illustrated), the plough 10 is set up such that plough bodies 22b, 24b, 26b, 28b, and 30b of each of the pairs are in contact with the soil. This second configuration is achieved after rotating the main frame by 180 degrees, such that the majority of plough bodies are arranged to the right of the tractor (not shown). It follows that the second configuration is also referred to as the "left turning configuration".

Tilling the field with the plough 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 10.

As the reversible plough 10 reaches the end of the first run, the main frame 12 is rotated by 180 degrees (reversed) with respect to the headstock 14. A turning cylinder (not shown), attached to the headstock 14 may be used to rotate (reverse) the plough 10. During rotation of the main frame, the first plurality of plough bodies, e.g. 22a, 24a, 26a, 28a, 30a, are transferred to the top of the plough 10. At the same time, the second plurality of plough bodies e.g. 22b, 24b, 26b, 28b, 30b, which were not in use in the previous run, is then transferred to the lower end of the plough 10 and will be submerged in the soil during the next run. The reversible plough is then in its second configuration (not shown).

Executing a second run of the field with the plough 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In both configurations of the plough 10 the main frame 12 is supported by an depth wheel 20. The depth wheel 20 is arranged at the back end 18 of the plough 10. Since the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b are generally fixed to the main frame via beams 42, 44 46, 48 and 50, there is no possibility of adjusting the working depth of said ground engaging tools without changing the ground clearance of the main frame 12. To this end, the plough 10 shown in FIGS. 1A to 10 includes depth wheel 20, which acts as a depth wheel to adjust the ground clearance of the main frame 12. A linkage provided between the depth wheel 20 and the main frame 12 allows the operator to lift or lower the main frame 12 with respect to a ground surface 80. Since the position of the plurality of first and second ground engaging tools is fixed with respect to the main frame 12, any change in the main frame's ground clearance will also affect the working depth of the plurality first and second ground engaging tools. In particular, if the main frame 12 is lowered by adjusting the link between the depth wheel 20 and the main frame 12, then the working depth of the plurality of first ground engaging tools shown in FIGS. 1A to 10 is increased, i.e. the plurality of first ground engaging tools are lowered further into the soil. If, on the other hand, the main frame 12 is lifted, then the working depth of the plurality of first ground engaging tools is decreased, i.e. the plurality of first ground engagement tools are pulled out of the soil.

Figure 3A:
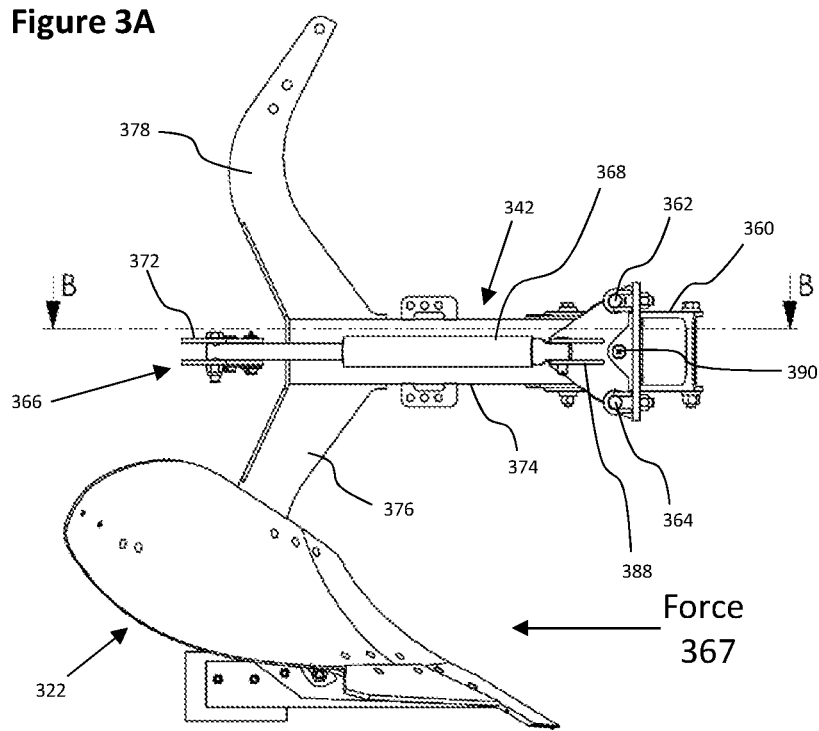
FIGS. 3A, 3B and 3C illustrate part of a plough that includes a stone trip mechanism for a plough body and a beam, where the plough body is in a working position.
Figure 3B:
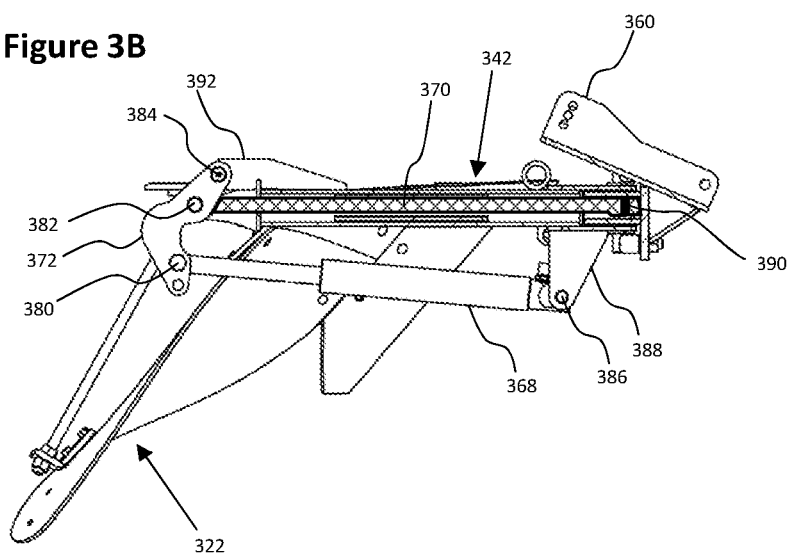
Figure 3C:
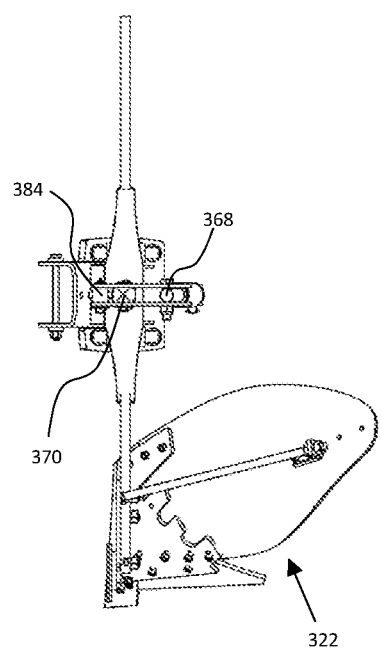
Figure 4A:
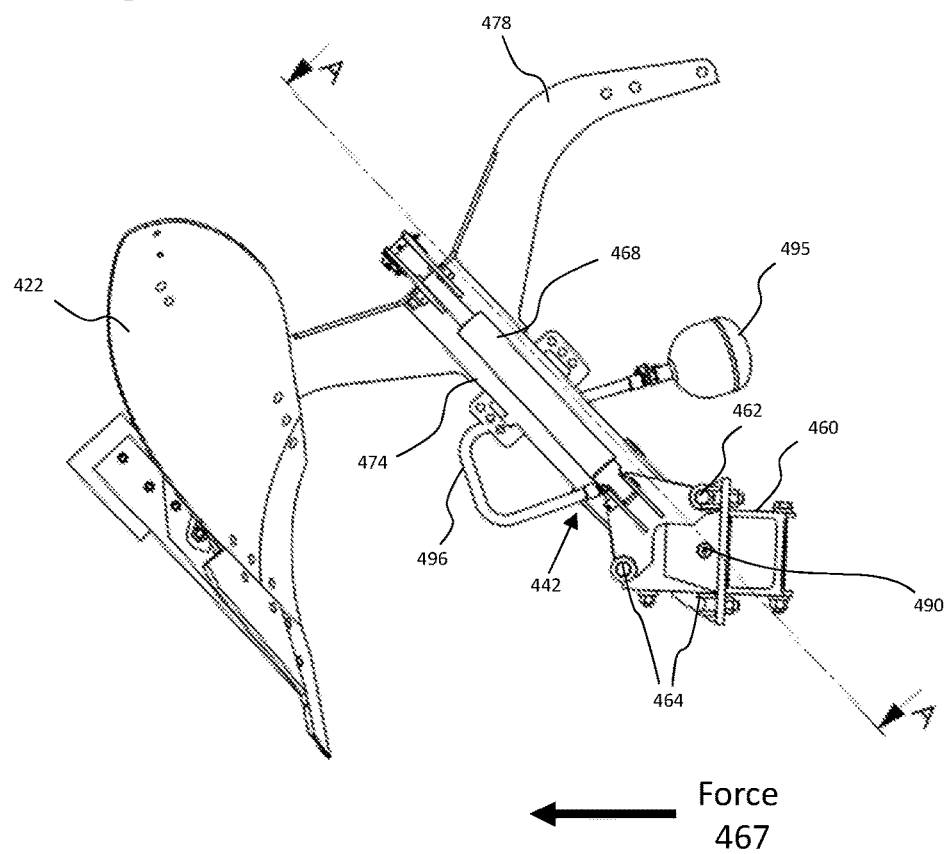
FIGS. 4A, 4B and 4C are corresponding views of the part of the plough of FIGS. 3A-3C that illustrate the stone trip mechanism where the plough body is in a tripped position.
Figure 4B:
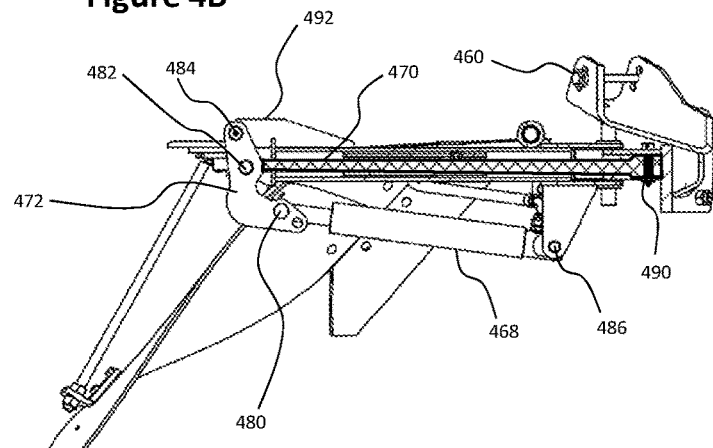
Figure 4C:
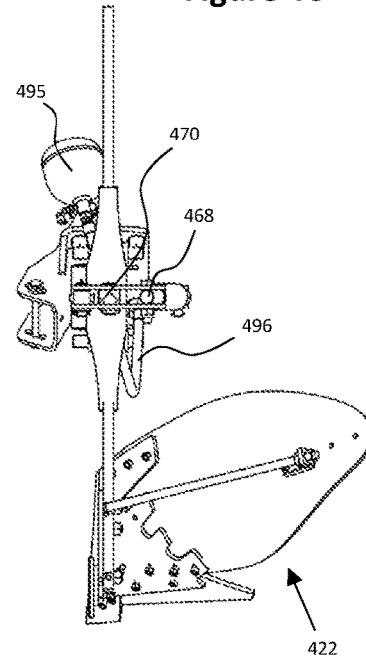

FIGS. 3A, 3B and 3C illustrate part of a plough that includes a stone trip mechanism for a plough body 322 and a beam 342, where the plough body 322 is in a working position. FIG. 3A shows a side view, FIG. 3B shows a cross-sectional view along the line B-B in FIG. 3A, and FIG. 3C shows an end view from a distal end of the beam 342. FIGS. 4A, 4B and 4C are corresponding views that illustrate the stone trip mechanism where the plough body is in a tripped position, as will be described below.

The beam 342 connects the plough body 322 to a frame (not shown) of a reversible plough. The plough body 322 is an example of a first ground engaging tool. These figures show a beam housing 360 that provides a mechanical connection between the beam 342 and the frame. The beam 342 is pivotally connected to the beam housing 360, and therefore is also pivotally connected to the frame. As will be discussed below, the beam housing 360 has two hinge points 362, 364, one of which is usable for each of the first and second configurations of the reversible plough.

The beam 342 has a substantially Y-shaped structure, which includes a central portion 374, a first beam arm 376 and a second beam arm 378. The central portion 374 of the beam 342 has a proximal end that is pivotally connected to the beam housing 360, and a distal end. The two beam arms 376, 378 extend from the distal end of the beam 342. The first beam arm 376 connects the plough body 322 to the central portion 374 of the beam 342. The second beam arm 378 connects a second plough body (not shown to assist with the clarity of the illustration) to the central portion 374 of the beam 342. The plough body 322 can be used to engage the soil and work the field when the reversible plough is in the first configuration. The second plough body (not shown) can be used to engage the soil and work the field when the reversible plough is in the second configuration.

FIGS. 3A, 3B and 3C also show an actuator mechanism 366 that provides a bias force to the beam 342 such that the plough body 322 is biased towards the working position. The actuator mechanism shown in these figures can also be referred to as a stone trip mechanism. The bias force can be set such that when the plough body 322 is being pulled through soil as the plough is working the field, the plough body 322 maintains its intended orientation. That is, the bias force applied by the actuator mechanism 366 overcomes the reactive force 367 experienced by the plough body as it moves through the soil. However, if the plough body 322 were to hit a stone or other obstruction buried under the ground, then the additional force that is applied to the plough body by the stone is able to overcome the bias force applied by the actuator mechanism such that the beam 342 can pivot about one of the hinge points 362, 364. When the beam 342 pivots in this way, the plough body 322 moves upwards as shown in FIGS. 4A to 4C such that it is above the stone. Therefore, the ploughing operation does not need to stop when a stone is experienced by the plough body 322. Once the plough body 322 has passed the stone, the bias force applied by the actuator mechanism returns the plough body 322 to its working position.

The actuator mechanism 366 includes a cylinder 368, a connection bar 370 and a linkage 372. The connection bar 370 in this example is mainly located in a cavity that is inside the central portion 374 of the beam 342. In this way, the central portion 374 of the beam 342 can be considered as a sleeve around the connection bar 370. Most of the length of the connection bar 370 is visible in the cross-sectional view of FIG. 3B, and an end of the connection bar 370 is also visible in FIG. 3C. In FIG. 3A, the connection bar 370 is obscured by the cylinder 368 and the beam 342.

In this example, the beam 342 includes a cylinder mounting region (lug) 388 at the proximal end of the central portion 374 of the beam 342, and a linkage mounting region (lug) 392 at the distal end of the central portion 374 of the beam 342. As shown in FIG. 3B, the cylinder mounting region 388 and the linkage mounting region 392 extend from opposite sides of the beam 342 such that they are laterally offset from each other at opposite ends of the connection bar 370.

A first end of the linkage 372 is connected to the linkage mounting region 392 at a linkage-beam connection point 384. In this way, the first end of the linkage 372 can rotate relative to the beam 342, but cannot experience a translational movement relative to the beam 342. A second end of the linkage 372 is connected to a first end of the cylinder 368 at a linkage-cylinder connection point 380. A second end of the cylinder 368 is connected to the cylinder mounting region 388 at a cylinder-beam connection point 386. A first end of the connection bar 370 is connected to the beam housing 360 (and therefore also the frame) at a bar-frame connection point 390. A second end of the connection bar 370 is pivotally connected to a mid-point of the linkage 372 at a bar-linkage connection point 382. That is, the bar-linkage connection point 382 is between the linkage-beam pivot point 384 and the linkage-cylinder connection point 380, along a longitudinal direction of the linkage 372.

In this example, the linkage-beam connection point 384, the linkage-cylinder connection point 380, the cylinder-beam connection point 386, the bar-frame connection point 390 and the bar-linkage connection point 382 are all pivot points such that the two associated components are rotatable relative to each other. It will be appreciated that in other examples, one or more of these connection points can be rigid connections that do not allow for relative rotational movement, and that any non-linear or rotational movement can be accommodated by other components in the actuator mechanism 366.

An accumulator (not shown in FIGS. 3A-3C) maintains a pressure of the fluid in the cylinder 368 when the ground engaging tool 322 is in its working position. The pressure in the cylinder 368 attempts to push the second end of the linkage 372 away from the cylinder mounting region 388, such that it would rotate about the bar-linkage connection point 382 and push the linkage-beam pivot point 384 back towards the beam housing 360. In this way, the central portion 374 of the beam 342 is biased along the connection bar such that it abuts the beam housing 360. Therefore, the bias force applied by the cylinder 368 acts to maintain the beam 342 in its current, working, position with respect to the beam housing 360.

FIGS. 4A, 4B and 4C illustrate the stone trip mechanism where the plough body 422 is in a tripped position. Features of FIGS. 4A and 4C that are also shown in FIGS. 3A to 3C will be given corresponding reference numbers in the 400 series, and will not necessarily be described again. FIGS. 4A and 4C also show an accumulator 495 that is connected to the cylinder 468 by a hose 496, such that it maintains the pressure of the fluid in the cylinder 468.

In FIGS. 4A to 4C, the plough body 422 has encountered a stone, which has resulted in a high reactive force 467 on the plough body 422 when it was in its working position. As will be discussed below, this high reactive force 467 is larger than the bias force that is provided by the cylinder 468 such that the beam 442 has pivoted about the first hinge point 462, and the plough body 422 has moved out of the way of the stone. More particularly, since the reactive force 467 will always be experienced by the lower, in-use, plough body, the beam 442 will always pivot about the upper hinge point. Therefore, if the plough were in the second configuration such that the second beam arm 478 were facing downwards, the beam 442 would pivot about the second hinge point 464 (which would be the upper hinge point) upon experiencing a stone.

As the beam 442 pivots about first hinge point 462, the second hinge point 464 separates and part of the beam 442 moves away from the beam housing 460. The first end of the connection bar 470 is connected to the beam housing 460 at the bar-frame connection point 490, such that the central portion 474 of the beam 442 moves along the connection bar 470 towards the linkage 472. Since the second end of the connection bar 470 is connected to a mid-point of the linkage 472 at a bar-linkage connection point 482, the linkage 472 rotates about the bar-linkage connection point 482. As the linkage 472 rotates, the second end of the linkage 472 (and therefore also the linkage-cylinder connection point 480) moves closer to the cylinder-beam connection point 486. As the linkage-cylinder connection point 480 moves closer to the cylinder-beam connection point 486, the cylinder 468 is compressed. In this way, the beam 442 is only able to rotate about the first hinge point 462 when the reactive force 467 on the plough body 422 results in a force on the cylinder 468 applied by the linkage 472, that is greater than the bias force that is provided by the fluid in the cylinder 468.

Figure 5:
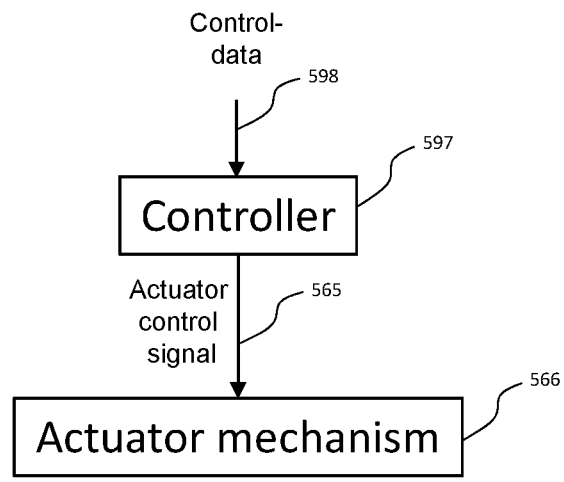
FIG. 5 schematically shows part of an agricultural implement, such as a plough, that includes a controller and an actuator mechanism.

FIG. 5 schematically shows part of an agricultural implement, such as a plough, that includes a controller 597 and an actuator mechanism 566. In the same way as described above, the actuator mechanism 566 can provide a bias force to a ground engaging tool such that it is biased towards a working position. In some examples, the bias force can be indirectly applied to the ground engaging tool by the actuator mechanism 566 applying a force to a beam that is mechanically connected to the ground engaging tool. When the bias force is overcome such that the ground engaging tool leaves it's working position, this will be referred to as a trip event. The actuator mechanism 566 can be the same as the one described with reference to FIGS. 3A, 3B, 3C, 4A, 4B and 4C, or could be different.

The controller 597 provides an actuator-control-signal 565 to the actuator mechanism 566 in order to automatically set the level of the bias force that is provided by the actuator mechanism 566. In this way, the actuator mechanism can be set such that the performance of the agricultural implement is improved. For instance, in examples where the actuator mechanism 566 is a stone trip mechanism for a plough, the stone trip mechanism can be controlled such that it trips at an appropriate reactive force that is experienced by the plough body. This can involve charging the accumulator that is shown in FIG. 4A such that it sets a level of the pressure in the cylinder based on the control-data (598). In this way: (i) the likelihood of a false trip occurring, when no stone is present, can be reduced; (ii) the likelihood of the ground engaging tool regularly being in a semi-tripped state when it should be in a working position can be reduced; and/or (iii) the likelihood that the ground engaging tool does not trip when a stone is encountered can be reduced.

The controller 597 can automatically set the level of the bias force that is provided by the actuator mechanism based on control-data 598. The control-data 598 can include previous-trip-event-data, which is representative of one or more earlier instances when the ground engaging tool has left its working position, examples of which are described below. Additionally or alternatively, the control-data 598 can include operational-data, soil-data and/or field-data.

The system may include one or more sensors (not shown) that provide the control-data 598 to the controller 597. Examples of sensors and associated control-data can include the following. At least some of the sensors can be implemented as inductive, pressure or ultrasonic sensors, as non-limiting examples.

A trip-sensor that can provide trip-data. The trip-sensor can directly or indirectly monitor the position of the ground engaging tool and/or the speed with which the ground engaging tool leaves it's working position. The trip-sensor or the controller can then determine the previous-trip-event-data based on the monitored position or speed of the ground engaging tool. The previous-trip-event-data can be representative of one or more earlier instances when the ground engaging tool has left its working position—for instance during a preceding predetermined period of time, during a current ploughing operation, or during a current run through the field during a current ploughing operation. In this way, the previous-trip-event-data can represent trip events in an earlier trip-window of time. The previous-trip-event-data can include the following:

trip-frequency-data that is representative of the frequency with which the ground engaging tool leaves its working position, and can be measured in number of trip events per hour, for example;

individual-trip-duration-data that is representative of the duration for which the ground engaging tool has left its working position for a previous trip event (that is, a trip event that has already finished by the ground engaging tool returning to its working position). This can be an average duration for a plurality of previous trip events;

cumulative-trip-duration-data that is representative of the duration for which the ground engaging tool has left its working position over a predetermined period of time. For instance, this can be the total duration that the ground engaging tool is not in its working position per hour; and trip-speed-data that is representative of the force/speed with which the ground engaging tool leaves its working position. This can be an average force/speed for a plurality of trip events.

The above instances of previous-trip-event-data can be provided directly by the trip-sensor or can be calculated by the controller 597 based on signals received from one or more sensors.

The trip-sensor can monitor the ground engaging tool/beam that is associated with the actuator mechanism that is to be controlled, or it can monitor a different ground engaging tool/beam on the agricultural implement. For instance, one or more of the above examples of previous-trip-event-data can include: (i) same-tool-trip-data that is representative of trip events for the ground engaging tool that is associated with the actuator mechanism that is to be controlled; and/or (ii) neighbouring-tool-trip-data that is representative of trip events for a ground engaging tool that is not associated with the actuator mechanism that is to be controlled. The neighbouring-tool-trip-data does not necessarily relate to an immediate neighbour of the ground engaging tool in question. For example, a neighbouring ground engaging tool can be any ground engaging tool associated with the agricultural implement that is in front of the ground engaging tool in question. In this way, an actuator mechanism can be proactively controlled before the associated ground engaging tool experiences a stone or other obstruction.

An operational-sensor that can provide operational-data, which is representative of one or more operational parameters of the agricultural implement or an associated agricultural vehicle. For instance:

a speed-sensor that provides speed-data, which is representative of the speed of the agricultural implement and/or an associated agricultural vehicle; and a wheel-slip-sensor that provides wheel-slip-data, which is representative of the degree (if any) of wheel slip experienced by a wheel of the agricultural implement and/or an associated agricultural vehicle.

A soil-sensor that can provide soil-data, which is representative of one or more characteristics of the soil that is to be worked by the agricultural implement. For instance:

a soil-moisture-sensor that provides soil-moisture-data, which is representative of the moisture level of the soil. An example implementation of such a soil-moisture-sensor is a microwave radar;

a soil-compaction-sensor that provides soil-compaction-data, which is representative of the compaction/density of the soil. A radar is one example of a sensor that can provide soil-compaction-data;

a soil-temperature-sensor that provides soil-temperature-data, which is representative of the temperature of the soil, optionally the temperature of the soil at a predetermined depth into the soil.

A field-sensor that can provide field-data. For instance:

a field-contour-sensor that provides field-contour-data, which is representative of the contours of the field in which the agricultural implement is operating. The field-contour-sensor can be a gyroscope or an accelerometer in some examples. The field-contour-data can be representative of whether the agricultural implement is travelling uphill or downhill.

Examples of how the controller 597 can process the above types of control-data include one or more of:

increasing the bias force if the trip-frequency-data is above a first-frequency-threshold, and/or decreasing the bias force if the trip-frequency-data is below a second-frequency-threshold;

increasing the bias force if the individual-trip-duration-data is above a first-individual-duration-threshold, and/or decreasing the bias force if the individual-trip-duration-data is below a second-individual-duration-threshold;

increasing the bias force if the cumulative-trip-duration-data is above a first-cumulative-duration-threshold, and/or decreasing the bias force if the cumulative-trip-duration-data is below a second-cumulative-duration-threshold;

increasing the bias force if the trip-speed-data is above a first-speed-threshold, and/or decreasing the bias force if the trip-speed-data is below a second-speed-threshold;

setting the bias force based on the speed-data, for instance using an equation or a look-up-table, or applying one or more speed-thresholds. In this way, higher bias forces can be applied for higher speeds on the basis that the reactive force experienced by the ground working tool is likely to be higher during normal use;

setting the bias force based on the wheel-slip-data, for instance using an equation or a look-up-table, or applying one or more wheel-slip-thresholds. In this way, higher bias forces can be applied for higher degrees of wheel slip on the basis that a reactive force experienced by the ground working tool could be contributing to restricting the forward movement of the agricultural implement and therefore also the undesired wheel slip. The reactive force (drag) experienced by the ground working tool can be lower when it's in the working position. For the example of a plough body, if the plough body starts to trip (and is angled with respect to its working position) then a higher reactive (drag) force can occur due to a more aggressive angle of the body in to the soil;

setting the bias force based on the soil-moisture-data, for instance using an equation or a look-up-table, or applying one or more soil-moisture-thresholds. In this way, lower bias forces can be applied for higher moisture soils on the basis that the reactive force experienced by the ground working tool is expected to be lower for relatively wet soil;

setting the bias force based on the soil-compaction-data, for instance using an equation or a look-up-table, or applying one or more soil-compaction-thresholds. In this way, higher bias forces can be applied for more compact/dense soils on the basis that the reactive force experienced by the ground working tool is expected to be higher for relatively dense soil;

setting the bias force based on the soil-temperature-data, for instance using an equation or a look-up-table, or applying one or more soil-temperature-thresholds. In this way, higher bias forces can be applied for colder soil on the basis that the reactive force experienced by the ground working tool is expected to be higher; and setting the bias force based on the field-contour-data, for instance using an equation or a look-up-table, or applying one or more field-contour-thresholds. In this way, higher bias forces can be applied when the agricultural implement is travelling uphill, and lower bias forces can be applied when the agricultural implement is travelling downhill. This can be on the basis that the reactive force experienced by the ground working tool is expected to be higher when it is being pulled uphill against gravity.

It will be appreciated that for each of the above examples, the objective of setting the bias force can be to reduce the number of false trip events (when no stone or other obstacle is encountered), and also to reduce the number of times that the actuator mechanism does not trip when it does encounter a stone. Furthermore, it can be an objective to set the bias force such that the ground engaging tool is in its correct working position when no stone is encountered. That is, the "normal" reactive force that is experienced by the ground engaging tool when no stone is encountered should not result in prolonged trip events.

In some examples, the controller 597 can set the level of the bias force that is provided by the actuator mechanism 566 such that that it does not exceed a maximum-force-value and/or it does not drop below a minimum-force-value. Especially in relation to the maximum-force-value, this can ensure that the bias force does not get so high that the ground engaging tool breaks when it experiences a stone, rather than causing a trip event.

One or more of the above thresholds may be settable by a user based such that they are appropriate for the field that is being worked by the agricultural implement. For examples where there is a first-threshold and a second-threshold, these thresholds may be the same as each other, or different.

In some examples, a location-determining-system can be associated with the agricultural implement and/or an associated agricultural vehicle. For instance, a plough and/or a tractor that pulls a plough can have a GPS. Optionally, a location (such as GPS coordinates) of the agricultural implement at the time that a trip event starts and/or stops can be stored in memory as trip-location-data. More specifically, in some applications the location of the specific ground engaging tool that experienced the trip event, at the time of the trip event, can be determined and stored in memory as trip-location-data. This can be achieved by providing a location-determining-system with each ground engaging tool. Alternatively, a single location-determining-system can be used for a plurality of ground engaging tools, and a predetermined offset can be applied to the location of the location-determining-system at the time of trip event, based on a received identifier of the ground engaging tool that was tripped. For instance, an offset distance and direction of each ground engaging tool with respect to the location-determining-system can be retrieved from memory based on which of the plurality of ground engaging tools. In some implementations, a controller can apply this offset to the location of the location-determining-system based on a determined direction of travel of the agricultural implement.

The previous-trip-event-data in some examples can include trip-location-data, which is representative of the location of the ground engaging tool at the time of a trip event. Therefore, the trip-location-data can be considered as a location of a stone or other obstruction to ploughing. Optionally, such trip-location-data can be stored in memory so that it can be used for future agricultural operations in the field. In one example, a subsequent method can generate a map of the field in which the agricultural implement was working, which includes identifiers for the locations of stone/obstacles based on the trip-location-data.

Furthermore, in some applications the control-data 598, that is used by the controller 597 to set the level of the bias force that is provided by the actuator mechanism 566, can include low-force-location-data, which is representative of known locations in a field that is to be worked by the agricultural implement in which a low bias force is desirable. In some examples, the low-force-location-data can include obstacle-location-data that is representative of known locations of obstacles in the field. The low-force-location-data can include previous-trip-location-data, which is representative of the location of the agricultural implement (and optionally the location of a particular ground engaging tool) at the time of a trip event for a previous agricultural operation (such as a ploughing operation) in the field. That is, the previous-trip-location-data can include trip-location-data that was stored for a previous agricultural operation. In some examples, the low-force-location-data can include field-property-location-data, which can define the locations of one or more of a boundary of the field, a headland, an area of the field that has already been worked (and therefore should not be worked again), or any other region of the filed that should not be processed by the agricultural implement.

In this way, the controller 597 can process the low-force-location-data such that it automatically decreases the bias force in a predetermined (virtual) area. Therefore, the ground engaging tool does not need to register a stone (or other obstacle such as a drainage well) by hitting it first, in order for the ground engaging tool to avoid it. The low-force-location-data can be considered as defining virtual forbidden areas in the field. The actuator mechanism 566 can be considered as operating as a section control that enables a ground working tool to be extracted from the soil such that it is dragged along on the surface at specific locations in the field, in order to improve the quality of the agricultural operation and/or reduce the likelihood of the agricultural implement being damaged.

In some examples, while the agricultural implement is working a field, the controller 597 can also receive implement-location-data that is representative of a current location of the agricultural implement. The implement-location-data can be received from a location-determining-system that is associated with the agricultural implement and/or an associated agricultural vehicle in the same way as described above. The controller 597 can process the implement-location-data and the low-force-location-data such that it decreases the bias force based on the low-force-location-data and the implement-location-data. For instance, based on a predetermined relationship between the low-force-location-data and the implement-location-data. An example of such a predetermined relationship is the result of a comparison between (i) the difference between the low-force-location-data and the implement-location-data, and (ii) a distance-threshold. In some examples, the controller 597 can determine, and take into account, a direction of travel of the agricultural implement as part of the predetermined relationship to determine whether or not a collision is likely, and therefore whether or not to decrease the bias force. It can be advantageous to decrease the bias force in advance of an expected collision with the stone/obstacle such that the ground engaging tool can trip more easily. This can reduce the likelihood of the ground engaging tool being damaged by the stone/obstacle.

Figure 6:
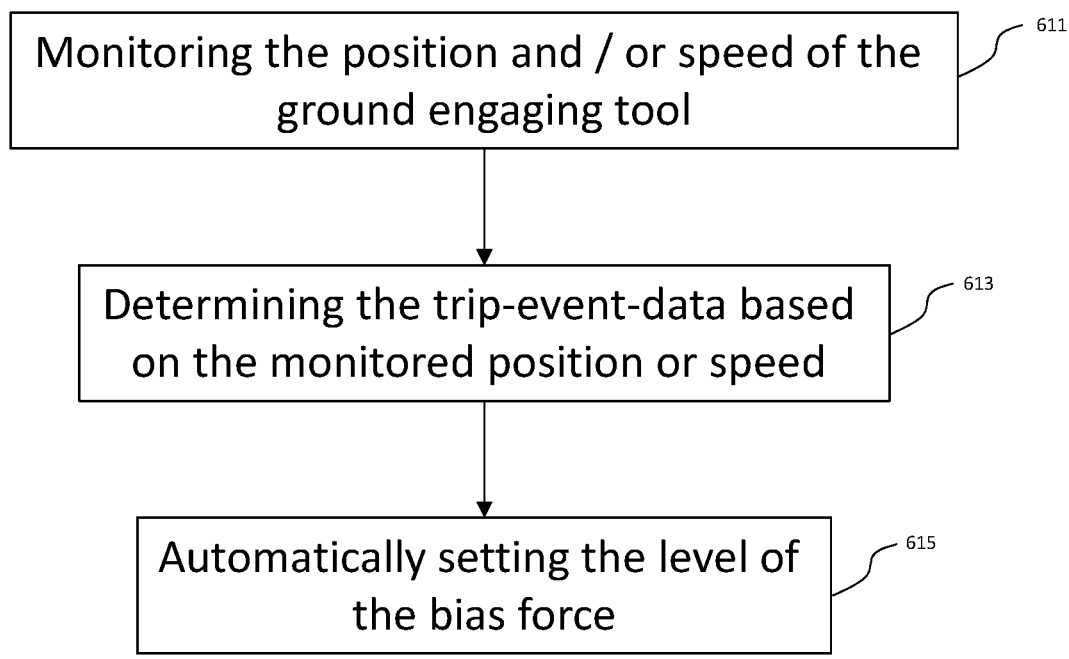
FIG. 6 shows a flow diagram for a method of operating an agricultural implement.

FIG. 6 illustrates an example embodiment of a method of operating an agricultural implement. The agricultural implement includes a ground engaging tool, a frame, a beam, and an actuator mechanism as described above.

The method is for automatically setting the level of a bias force that is provided by the actuator mechanism based on control-data at step 615. In this example, the control-data includes previous-trip-event-data as described in detail above, and the method includes the optional steps 611, 613 of acquiring and determining the previous-trip-event-data.

At step 611, the method involves monitoring the position and/or speed of the ground engaging tool. This can be performed directly or indirectly, for example by monitoring the position and/or speed of a component that is mechanically connected to the ground engaging tool such as the beam. In some examples, it can be more convenient to monitor the position or speed of parts of the beam that are not underground when the ground engaging tool is in its working position. In some examples, the method can determine the position and/or speed of the ground engaging tool by monitoring the position of a cylinder (or other component) of the actuator mechanism.

At step 613, the method involves determining the previous-trip-event-data based on the monitored position or speed of the ground engaging tool. For instance, this can include counting the number of trip events to determine the trip-frequency-data, measuring the duration of the trip events to determine the individual-trip-duration-data or the cumulative-trip-duration-data, and determining a rate of change of the displacement of the ground engaging tool to determine the trip-speed-data.

Although this detailed description makes reference to plough bodies, it should be appreciated that the present disclosure is not limited to such ground engaging tools. Rather, any form of ground engaging tool of any agricultural implement may be used in connection with the actuator mechanism and controller described above. Similarly, the number and arrangement of the ground engaging tools shown in the Figures should not be understood to be limiting to the scope of this disclosure.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. A plough comprising:
   a plough body;
   an actuator mechanism configured to provide a bias force to the plough body such that the plough body is biased toward a working position; and
   a controller communicatively coupled to the actuator mechanism, wherein the controller is configured to automatically set a level of the bias force that is provided by the actuator mechanism based on control-data, wherein the actuator mechanism is a stone trip mechanism;
   wherein the control-data comprises previous-trip-event-data, which is representative of one or more earlier instances when the plough body associated with the actuator mechanism that is to be controlled has left the working position during a current ploughing operation.

2. The plough of claim 1, wherein the stone trip mechanism is further configured such that the plough body moves away from the working position when the plough body experiences a reactive force greater than the bias force.

3. The plough of claim 1, wherein the previous-trip-event-data comprises one or more of:
   trip-frequency-data that is representative of a frequency with which the plough body leaves the working position;
   individual-trip-duration-data that is representative of a duration for which the plough body has left the working position for an individual trip event;
   cumulative-trip-duration-data that is representative of a duration for which the plough body has left the working position over a predetermined period of time; or
   trip-speed-data that is representative of a speed with which the plough body leaves the working position.

4. The plough of claim 1, wherein the control-data comprises operational-data, which is representative of one or more operational parameters of the plough or an associated agricultural vehicle.

5. The plough of claim 4, wherein the operational-data comprises one or both of:
   speed-data, which is representative of a speed of the plough and/or the associated agricultural vehicle; or
   wheel-slip-data, which is representative of a degree of wheel slip experienced by a wheel of the plough and/or the associated agricultural vehicle.

6. The plough of claim 1, wherein the control-data comprises soil-data, which is representative of one or more characteristics of soil that is to be worked by the plough.

7. The plough of claim 6, wherein the soil-data comprises one or more of:
- soil-moisture-data, which is representative of a moisture level of the soil;
- soil-compaction-data, which is representative of a density of the soil; or
- soil-temperature-data, which is representative of a temperature of the soil.

8. The plough of claim 1, wherein:
- the control-data comprises low-force-location-data, which is representative of known locations in a field that is to be worked by the plough in which a low bias force is desirable; and
- the controller is configured to automatically set the level of the bias force that is provided by the actuator mechanism based on (i) the low-force-location-data and (ii) implement-location-data that is representative of a current location of the plough.

9. The plough of claim 1, wherein the controller is configured to set the level of the bias force that is provided by the actuator mechanism such that the level of the bias force does not exceed a maximum-force-value and/or does not drop below a minimum-force-value.

10. The plough of claim 1, wherein:
- the actuator mechanism comprises a cylinder; and
- the controller is configured to set a level of fluid pressure in the cylinder based on the control-data.

11. The plough of claim 1, wherein the controller is configured to store a location of the plough body at a time that the plough body leaves the working position as trip-location-data.

12. A method of operating a plough, comprising:
- automatically, via a controller communicatively coupled to an actuator mechanism, setting a level of a bias force that is provided by the actuator mechanism based on control-data, wherein the actuator mechanism is configured to provide the bias force to a plough body of the plough such that the plough body is biased toward a working position, and the actuator mechanism is a stone trip mechanism;
- wherein the control-data comprises previous-trip-event-data, which is representative of one or more earlier instances when the plough body associated with the actuator mechanism that is to be controlled has left the working position during a current ploughing operation.

13. The method of claim 12, comprising:
- directly or indirectly monitoring a position of the plough body, a speed with which the plough body leaves the working position, or a combination thereof; and
- determining the previous-trip-event-data based on the monitored position, speed, or combination thereof, of the plough body.

14. A plough comprising:
- a plough body;
- an actuator mechanism configured to provide a bias force to the plough body such that the plough body is biased toward a working position; and
- a controller communicatively coupled to the actuator mechanism, wherein the controller is configured to automatically set a level of the bias force that is provided by the actuator mechanism based on control-data, wherein the actuator mechanism is a stone trip mechanism;
- wherein the control-data comprises previous-trip-event-data, which is representative of one or more earlier instances when another plough body of the plough not associated with the actuator mechanism that is to be controlled has left a respective working position during the current ploughing operation.

15. The plough of claim 14, wherein the control-data comprises operational-data, which is representative of one or more operational parameters of the plough or an associated agricultural vehicle.

16. The plough of claim 15, wherein the operational-data comprises one or both of:
- speed-data, which is representative of a speed of the plough and/or the associated agricultural vehicle; or
- wheel-slip-data, which is representative of a degree of wheel slip experienced by a wheel of the plough and/or the associated agricultural vehicle.

17. The plough of claim 14, wherein the control-data comprises soil-data, which is representative of one or more characteristics of soil that is to be worked by the plough.

18. The plough of claim 17, wherein the soil-data comprises one or more of:
- soil-moisture-data, which is representative of a moisture level of the soil;
- soil-compaction-data, which is representative of a density of the soil; or
- soil-temperature-data, which is representative of a temperature of the soil.

* * * * *